United States Patent
Nocievski

[19]

[11] Patent Number: 6,045,290
[45] Date of Patent: Apr. 4, 2000

[54] CORNER JOINT BETWEEN THE END PORTIONS OF TWO BOARD-LIKE MEMBERS

[75] Inventor: Giorgi Nocievski, Älmhult, Sweden

[73] Assignee: IKEA International A/S, Humlebaek, Denmark

[21] Appl. No.: 09/029,278

[22] PCT Filed: Aug. 29, 1996

[86] PCT No.: PCT/IB96/00911

§ 371 Date: Feb. 26, 1998

§ 102(e) Date: Feb. 26, 1998

[87] PCT Pub. No.: WO97/08465

PCT Pub. Date: Mar. 6, 1997

[30] Foreign Application Priority Data

Aug. 29, 1995 [DK] Denmark ............................. 9500332

[51] Int. Cl.[7] .................................................. F16B 12/02
[52] U.S. Cl. .................... 403/231; 403/230; 403/408.1
[58] Field of Search .................................. 403/230, 260, 403/258, 231, 256, 298, 292, 282, 408.1, 401, 402

[56] References Cited

U.S. PATENT DOCUMENTS

| 16,557 | 2/1857 | Stimpson | 403/382 |
|---|---|---|---|
| 637,212 | 11/1899 | McCune | 403/231 |
| 1,110,009 | 9/1914 | Ritter | 403/231 |
| 1,335,554 | 3/1920 | Callahan | 403/231 |
| 1,533,099 | 4/1925 | Carroll | 403/231 |
| 5,536,108 | 7/1996 | Kvalheim | 403/231 |

OTHER PUBLICATIONS

MI, A Woodworker's Guide to Joinery by Thomas H. Jones, Sep. 1983.

The Carpenters and Joiners Assistance, Joints in Joinery by Newlands, 1860.

Primary Examiner—Lynne H. Browne
Assistant Examiner—Kenneth Thompson
Attorney, Agent, or Firm—Flehr Hohbach Test Albritton & Herbert LLP; Richard E. Backus

[57] ABSTRACT

A corner joint in a frame, especially for joining furniture parts. The joint has first and second board-like members each of which have end portions. The first member has a long edge and a projecting part in its end portion. The second member has a mortise in its end portion into which the projecting part engages. A stud secures the first and second members together. The projecting part and mortise are each wedge-shaped, with the second member having an end face. The end portion of the first member comprises a box-shaped projection having an outer side face that is formed with holes. A longitudinal axis of the stud extends through a hole in the box-shaped projection and through the end face of the second member, with the stud intersecting the projecting part. This construction enables the corner joint to be easily separated without damaging the members.

17 Claims, 4 Drawing Sheets

CORNER JOINT BETWEEN THE END PORTIONS OF TWO BOARD-LIKE MEMBERS

FIELD OF THE INVENTION

The invention relates to a corner joint between the end portions of two board-like members made of wood or woodlike material in a frame for joining furniture parts, the end portion of the first member being provided with at least one projecting part substantially parallel to one of the long end edges of said member and engaging in one or more corresponding mortises in the end portion of the second member, said members being held together by means of one or more securing means in the form of one or more stud means, whereby the projecting part or parts of the first member and the corresponding mortise or mortises of the second member are substantially wedge-shaped, and that the end portion of the first member is further provided with a mainly box-type projection adjacent to one end face of the second member.

DESCRIPTION OF THE PRIOR ART

EP patent application 0 479 767 describes a corner joint between two members provided with interacting projecting part and mortise, said members being secured with respect to each other by means of glue or by means of undercutting the mortise. However, this is not a satisfactory solution, as gluing requires the ends to be pressed together while the glue is drying. Moreover, the members are not easily separated once the corner joint is established. If the members of the corner joint are undercut, said members will not be secured in the longitudinal direction of the projecting part or parts, unless said part or parts are directly pressed into the mortise, the latter requiring an exact dimensioning of the members with respect to each other.

U.S. Pat. No. 3,944,310 discloses a joint having a first member with a projection engaging in a mortise in a second member, the projection and mortise being wedge-shaped, a box-shaped projection being provided on the first member and a bolt connecting the members. The corner joint does not work satisfactorily because it cannot be established and separated so quickly. The establishment or separation requires use of a screwdriver. Besides, the stress load on the boly—when the corner joint is exposed to a bending moment—is concentrated to a very limited zone, namely the zone where the bolt is leaving the first member and goes into the other member.

SUMMARY OF THE INVENTION

The object of the invention is to provide a corner joint of the above-mentioned type, said corner joint being able to secure the members with respect to each other against forces in any given direction, while at the same time—if desired—allowing easy separation without damaging the members.

The corner joint according to the invention is characterized in that the stud means is (are) arranged mainly perpendicular to the large outer side face of the box-type projection of the first member and moreover is (are) fixed in drilled holes in said box-type projection and in the end portion of the second member by interference fit, the stud means interseting the projection part or parts. When assembled, the members of the corner joint are thus secured with respect to each other against forces in any given direction. As soon as the securing means are removed, the members are no longer held together. The corner joint is easily assembled and separated and moreover, it is easy to manufacture.

According to the invention, the projection part or parts of the first member can be intersected by the stud means in such a way that the area covered by the separate intersection—seen in cross-section perpendicular to the longitudinal axis of the stud means—corresponds to only part of the cross-sectional area of the stud means. This embodiment allows for a greater degree of constructional freedom.

According to the invention, the projecting parts of the first member can be present in a number of two or three and together define a zigzag shape. This is a particularly advantageous embodiment, if the first member is considerably thicker relative to the second member, since the contact area between the two members can be significantly enlarged thus increasing the rigidity of the corner joint.

In an embodiment of the invention the stud means can be provided with an elongated hole for a tool, such as a thumb screw, to be screwed in to separate the corner joint. This ensures an easy way of separating the corner joint without damaging the stud means.

In another embodiment of the invention the tips of the wedge-shaped projections and the cut-out of the first member can be rounded and the tips of the wedge-shaped projection and the cut-out of the second member can also be rounded. This reduces notch effect.

Finally, according to the invention the stud means can jut out beyond the box-type projection. This gives the corner joint a particularly attractive/interesting appearance and contributes to an easier separation of the corner joint.

BRIEF DESCRIPTION OF THE DRAWING

The invention and particularly advantageous embodiments are described in greater detail below with reference to the accompanying drawing in which.

DETAILED DESCRIPTION OF THE PREFERRED EMBODIMENT

Figure 1:
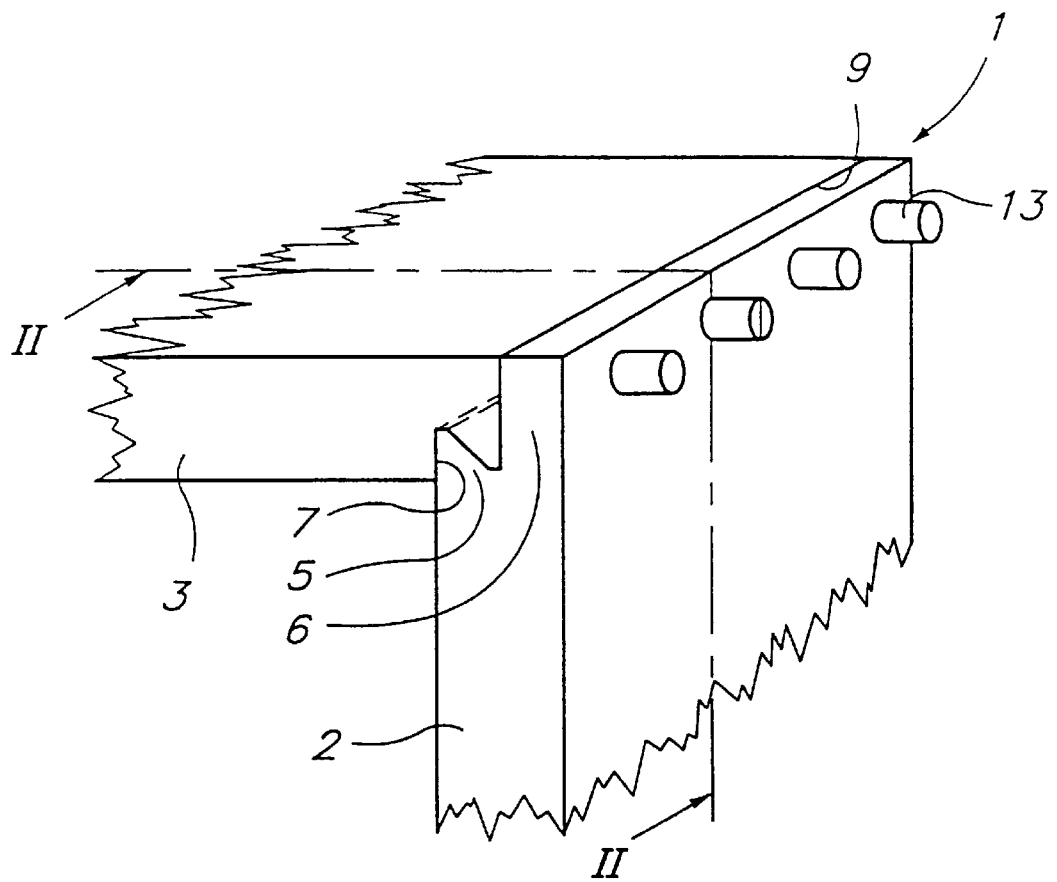
FIG. 1 shows a perspective view of one embodiment of the corner joint according to the invention, the first and second member of said corner joint being clearly visible.
Figure 2:
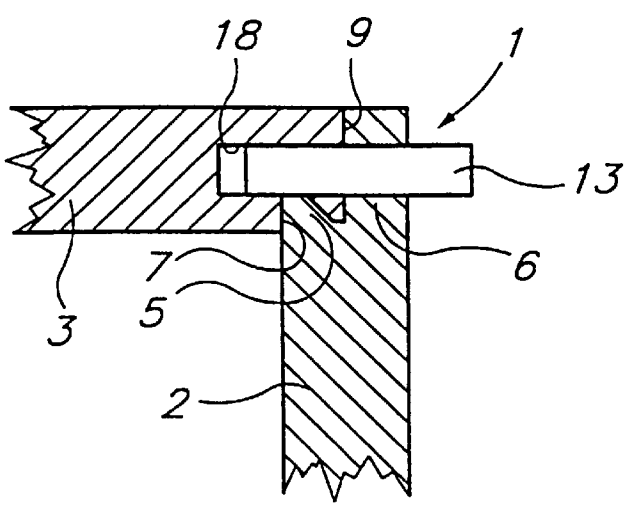
FIG. 2 shows a cross-sectional view along the line II—II of FIG. 1.

The corner joint 1 shown in FIGS. 1 and 2 is established between the end portions af a first board-like member 2 and a second board-like member 3, preferably made of wood, in a frame, especially for joining of furniture parts. The end portion of the first member 2 is provided with a wedge-shaped projecting part 5, said part engaging in a corresponding wedge-shaped mortise 7 in the end portion of the second member 3. The end portion of the first member 2 is further provided with a substantially box-type projection 6 adjacent to one end face 9 of the second member 3. The two members 2 and 3 are held together by one or more stud means 13 such as four stud means as shown in FIG. 1. The stud means 13 are elongated and extend through the box-type projection 6 of the first member 2 into the end portion of the second member 3.

The stud means 13 may be wooden pegs having a circular cross-section as shown in FIGS. 1 and 2, said stud means being arranged substantially perpendicular to the large outer side face of the box-type projection 6 of the first member 2.

As is apparent from FIG. 2, the wooden pegs 13 intersect the box-type projection 6 of the first member 2. Furthermore, the wooden pegs 13 intersect the wedge-shaped projecting part 5 in such a way that the intersection area—seen in cross-section perpendicular to the longitudinal axis of the stud means 13—corresponds to only part of the cross-sectional area of the stud means 13. The wooden pegs 13 are not completely impressed so that a section of said pegs projects out of the members. Thus said pegs contribute to an attractive and/or interesting appearance of the corner joint which can be exploited for design purposes.

Figure 3:
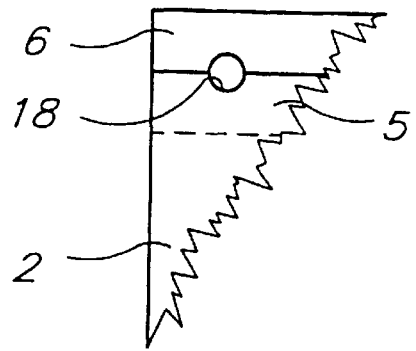
FIG. 3 shows a rear view of the embodiment of FIG. 1 with the second member being removed; this Fig. shows clearly how the hole for a securing means partially intersects the wedge-shaped projecting part.

FIG. 3 shows a rear view of the first member 2 with the second member 3 being removed. This embodiment corresponds to the one shown in FIGS. 1 and 2. FIG. 3 shows particularly clearly in which way the holes 18 for the stud means (not shown) intersect the wedge-shaped projecting part 5. In this case the intersection area—seen in cross-section penpendicular to the longitudinal axis of the stud means 13—corresponds to 50% of the cross-section of the stud means. The intersection area may, however, be any desired proportion of the cross-sectional area of the stud means. This embodiment allows for a greater degree of constructional freedom.

Figure 4:
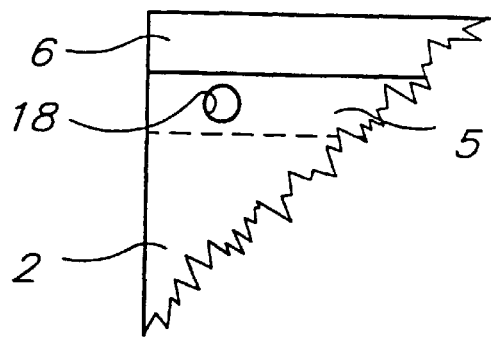
FIG. 4 shows the same view as FIG. 3 but with the hole completely intersecting the wedge-shaped projecting part.

FIG. 4 shows a rear view of the first member 2 in another embodiment of the invention, the projecting part 5 of the first member 2 as well as the end portion of the second member (not shown) being provided with a number of drilled holes 18, the stud means (not shown) being guided through said holes and fastened by an interference fit.

Figure 5:
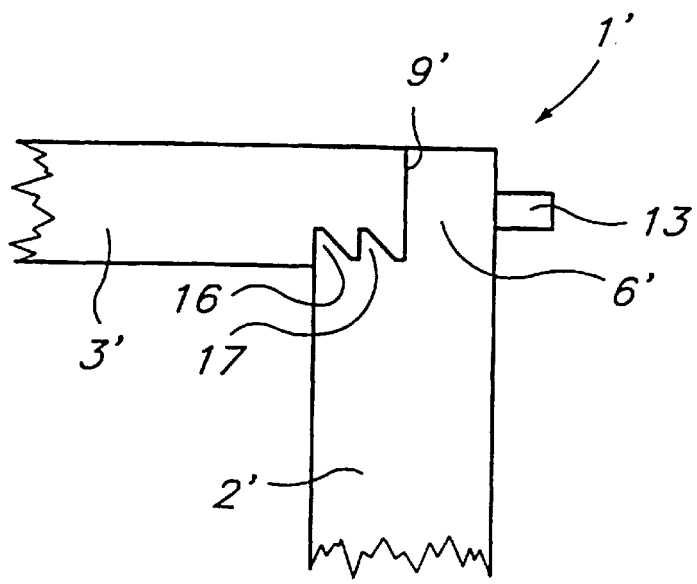
FIG. 5 shows a side view of a second embodiment of the corner joint.

FIG. 5 shows a second embodiment of the corner joint, where the first member 2' has two wedge-shaped projecting parts 16, 17 defining a zigzag shape. This is a particularly advantageous embodiment, if the first member 2' is considerably thicker relative to the second member 3', since the contact area between the two members can be significantly enlarged thus increasing the rigidity of the corner joint.

Figure 6:
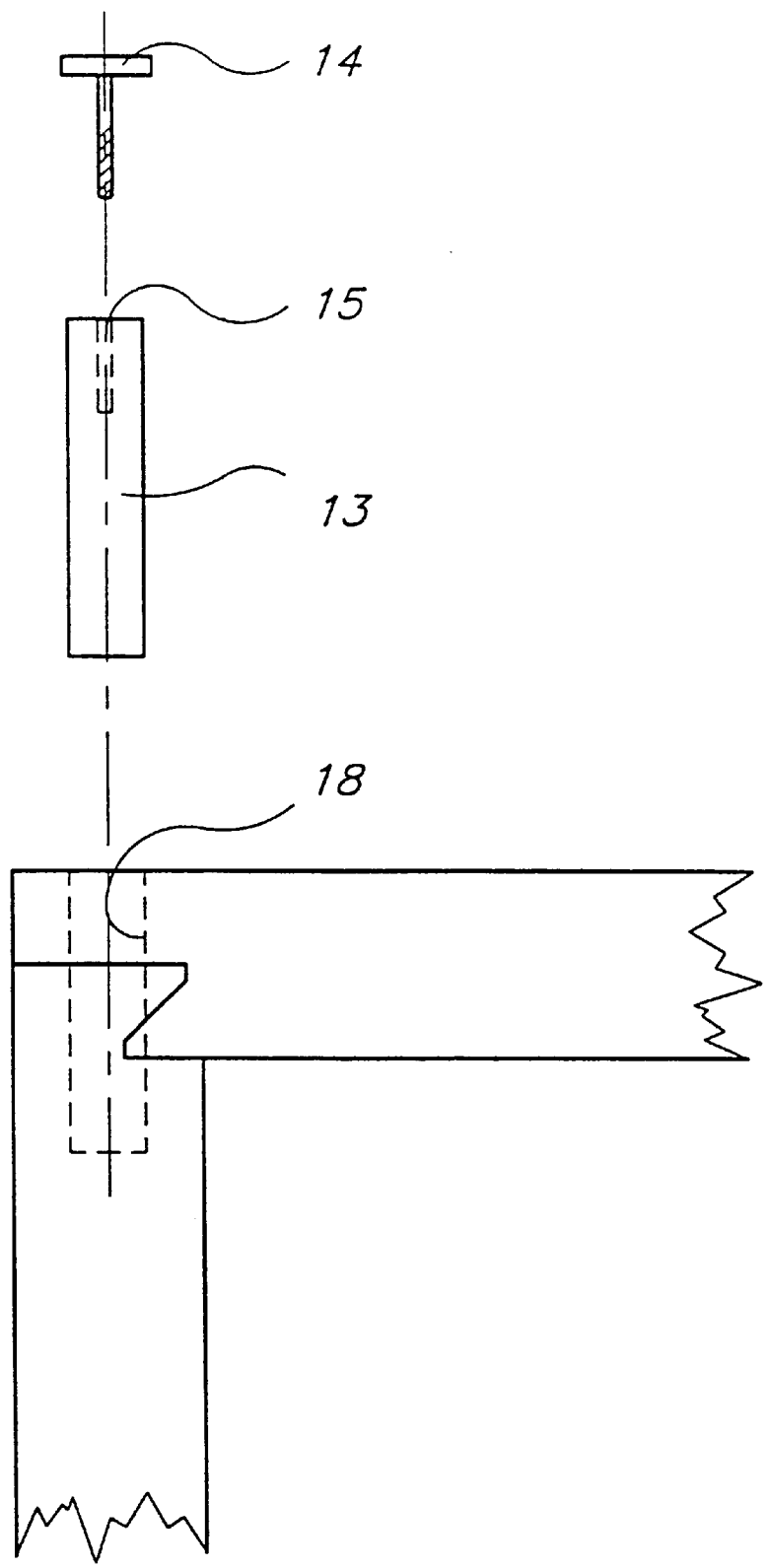
FIG. 6 shows a side view of an embodiment of the corner joint, the stud means being provided with a longitudinal hole, and a tool in the form of a thumbscrew for screwing into the hole in order to separate the corner joint; the thumbscrew is shown removed from the stud means, and the stud means is shown removed from the board member.

FIG. 6 shows the same embodiment of a corner joint as FIGS. 1 and 2, the stud means 13, however, being made of a wooden peg provided with a hole 15 for screwing a separating tool in the form of a thumbscrew 14 into said hole.

Figure 7:
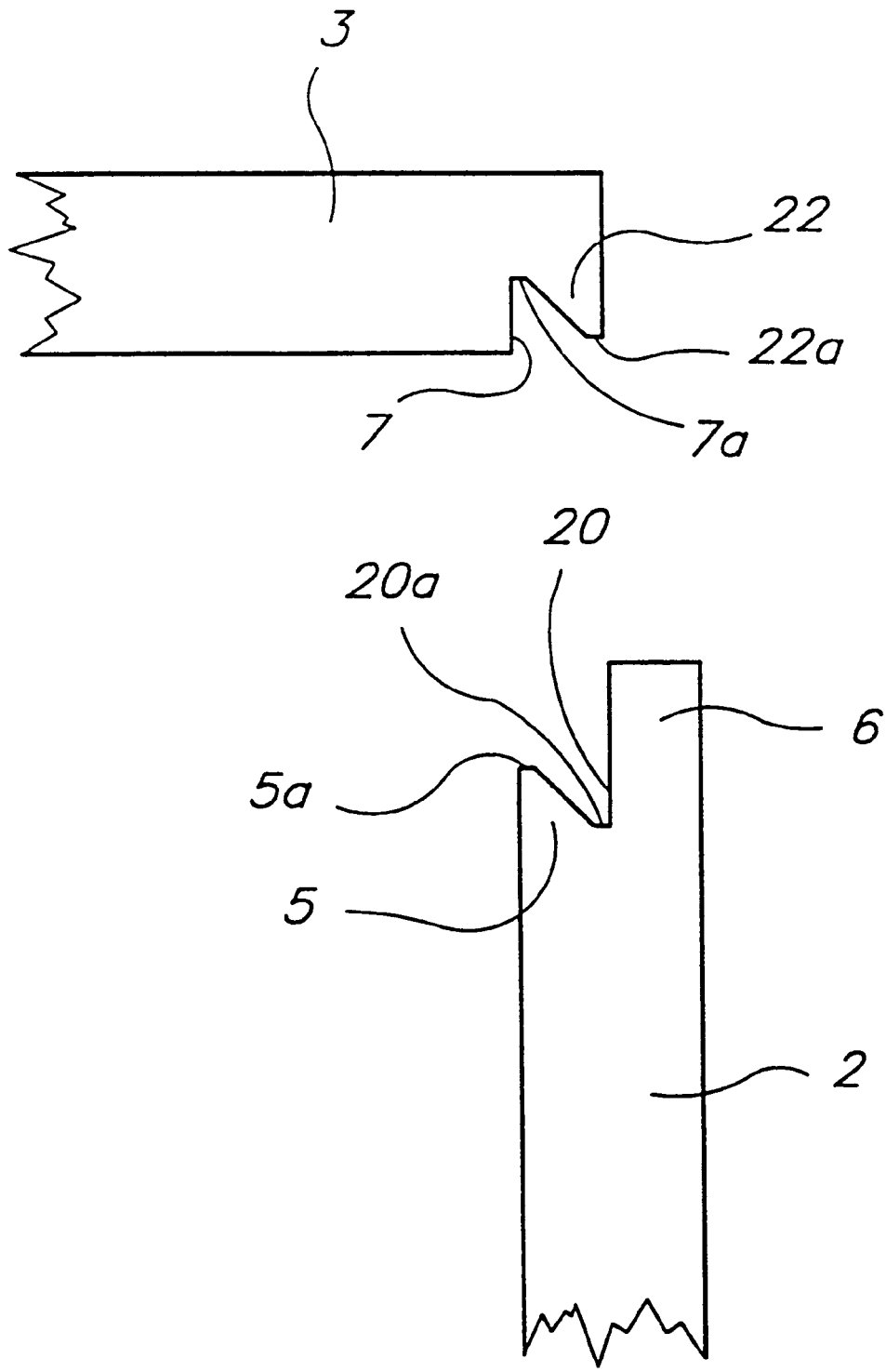
FIG. 7 shows a side view of the two board members of the corner joint with said members separated.

FIG. 7 shows two board members 2, 3 of a corner joint according to the invention. The acute end 5a of the wedge-shaped projection is cut off and the acute end 7a of the wedge-shaped cut-out 7 is cut off. The acute end 22a of the wedge-shaped projection 22 and the acute end 20a of the wedge-shaped cutout 20 are also cut off. This reduces notch fatigue. It is also conceivable to round the tips instead of uniformly cutting them off. Flattening or rounding is not absolutely necessary.

When a corner joint according to the invention is used in a frame construction, where additional rigidity is desired, a plate can be mounted on the back side of the frame construction or position inside a groove in the board members provided at the inner face of the corner joint close to the back side of the frame construction.

Gluing battens made of solid wood on the end portions of the corner joint for the mortises to be milled into said battens permits the use of a board material of reduced strength. Said battens also enhance the ornamental effect.

The invention is not restricted to the above-mentioned embodiments. The board members may, for example, be made of plastics, pressed wood or other materials. The stud means may also be conical pins or have another shape; they may be made of metal, plastics or other materials.

The corner joint according to the invention can also be described by the Swedish expression "en halvöppen gradsink".

I claim:

1. A corner joint in a frame which has first and second board-like members that are each comprised of respective end portions, the first member having a long edge and the end portion of the second member having a mortise, the end portion of the first member comprising at least one projecting part which is substantially parallel to the long edge and which engages the mortise, securing means for holding the first and second members together, the securing means comprises a stud, the projecting part and the mortise are each substantially wedge-shaped, the second member has an end face, the end portion of the first member comprises a box-shaped projection which is positioned adjacent the end face, and which has an outer side face together with holes, the corner joint characterized in that the stud has a longitudinal axis and extends through said hole in the box-shaped projection and through the end face of the second member, and the stud intersects the projecting part.

2. A corner joint according to claim 1 and further characterized in that the stud intersects the projecting part through an area of intersection which is perpendicular to the longitudinal axis, and the area of intersection is less than the cross sectional area of the stud.

3. A corner joint according to claim 2 and further characterized in that the projecting part has a plurality of segments which are joined end-to-end in a zigzag shape.

4. A corner joint according to claim 3 and further characterized in that stud is formed with an elongate hole adapted for receiving a tool which can be screwed into the hole to separate the corner joint.

5. A corner joint according to claim 4 and further characterized in that the wedge-shaped projecting part has a rounded tip, the first member is formed with a rounded cut-out and the second member is formed with a rounded cut-out.

6. A corner joint according to claim 5 and further characterized in that the stud projects out beyond the box-shaped projection.

7. A corner joint according to claim 3 and further characterized in that the projecting part of the first member is intersected by the stud along an area of intersection in a plane which is perpendicular to said longitudinal axis and the cross sectional area is smaller than the cross sectional area of the stud.

8. A corner joint according to claim 1 and further characterized in that the projecting part has a plurality of segments which are joined end-to-end in a zigzag shape.

9. A corner joint according to claim 1 and further characterized in that stud is formed with an elongate hole adapted for receiving a tool which can be screwed into the hole to separate the corner joint.

10. A corner joint according to claim 2 and further characterized in that stud is formed with an elongate hole adapted for receiving a tool which can be screwed into the hole to separate the corner joint.

11. A corner joint according to claim 1 and further characterized in that the wedge-shaped projecting part has a rounded tip, the first member is formed with a rounded cutout and the second member is formed with a rounded cut-out.

12. A corner joint according to claim 2 and further characterized in that the wedge-shaped projecting part has a rounded tip, the first member is formed with a rounded cutout and the second member is formed with a rounded cutout.

13. A corner joint according to claim 3 and further characterized in that the wedge-shaped projecting part has a rounded tip, the first member is formed with a rounded cut-out and the second member is formed with a rounded cut-out.

14. A corner joint according to claim 1 and further characterized in that the stud projects out beyond the box-shaped projection.

15. A corner joint according to claim 2 and further characterized in that the stud projects out beyond the box-shaped projection.

16. A corner joint according to claim 3 and further characterized in that the stud projects out beyond the box-shaped projection.

17. A corner joint according to claim 4 and further characterized in that the stud projects out beyond the box-shaped projection.

* * * * *